Sept. 1, 1964  H. A. CARLSON  3,146,845
CARBURETOR IDLE CONTROL
Filed May 17, 1962

*INVENTOR.*
HAROLD A. CARLSON
BY
AGENT

United States Patent Office 3,146,845
Patented Sept. 1, 1964

3,146,845
CARBURETOR IDLE CONTROL
Harold A. Carlson, Brentwood, Mo., assignor to ACF Industries, Incorporated, New York, N.Y., a corporation of New Jersey
Filed May 17, 1962, Ser. No. 195,609
8 Claims. (Cl. 180—77)

This invention relates to means for controlling the speed of an internal combustion engine of an automotive vehicle having an accessory powered from the engine, adapted to prevent stalling of the engine under conditions of high demand of the accessory with attendant increased load on the engine, and more particularly to a speed control system of this character for the engine of an automotive vehicle equipped with a power steering system.

A typical power steering system for an automotive vehicle comprises a hydraulically operated power means for power assist in turning the front wheels of the vehicle. This power means is supplied with hydraulic fluid (such as oil) under pressure by a hydraulic pump driven by the engine of the vehicle. When the front wheels of the vehicle equipped with such a power steering system are cramped left or right under conditions of maximum resistance to turning of the wheels, as for example, when parking the vehicle or pulling out of a parking space, the front wheels are cramped left or right with the vehicle at rest, a relatively heavy load is placed on the pump and hence on the engine. Under such conditions, the idle speed of the engine may drop below that necessary to maintain the engine in operation, and the engine will stall.

Accordingly, among the several objects of this invention may be noted the provision of a speed control system for the engine of an automotive vehicle having power steering which functions in response to turning of the steering wheel of the vehicle and resultant increase in load on the engine to increase the engine idle speed to tend to prevent stalling of the engine; and the provision of such a system which is economical to provide and reliable in operation. In general, the invention involves the provision of means operative on the means (such as a carburetor) for supplying a mixture of air and fuel to the engine for increasing the engine speed in response to turning the steering wheel. More particularly, increase in engine speed is effected by increasing the flow of the mixture to the engine, increased mixture flow being obtained by opening the throttle of the mixture supply means. Other objects and features will be in part apparent and in part pointed out hereinafter.

The invention accordingly comprises the constructions hereinafter described, the scope of the invention being indicated in the following claims.

Figure 1:
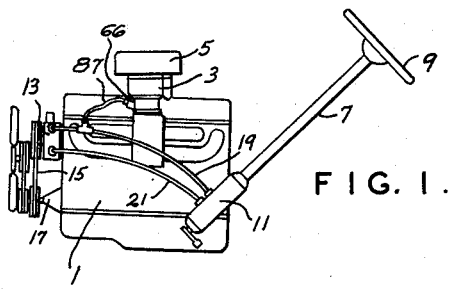
Figure 2:
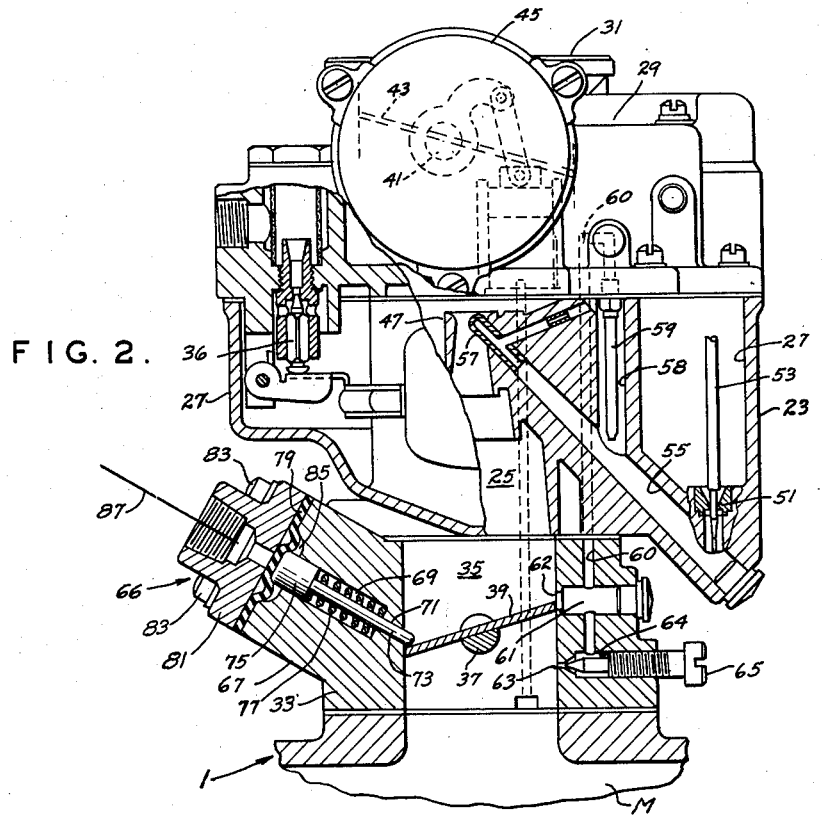

In the accompanying drawings, in which one of various possible embodiments of the invention is illustrated, FIG. 1 is a view in side elevation of the engine of an automotive vehicle equipped with a power steering system and a speed control system of this invention; and FIG. 2 is an enlarged view in elevation with parts broken away and shown in section of a carburetor provided in accordance with this invention with means for opening the throttle.

Corresponding reference characters indicate corresponding parts throughout the several views of the drawings.

Referring to the drawings, there is indicated at 1 in FIG. 1 the internal combustion engine of an automotive vehicle. At 3 is indicated the carburetor for the engine, and at 5 is indicated the air filter on the air horn of the carburetor. The steering column of the vehicle is indicated at 7, and the steering wheel of the vehicle is indicated at 9. A power steering gear is indicated at 11.

This may be any one of various conventional hydraulically operated power steering gears. As will be understood, such a power steering gear generally comprises a hydraulic power cylinder supplied with hydraulic fluid (oil) under pressure by a pump 13 driven by a belt 15 from the crankshaft 17 of the engine. Lines for delivering fluid from the pump to the power cylinder and for returning fluid from the cylinder to the fluid reservoir associated with the pump are indicated at 19 and 21. It is inherent in the operation of such a power steering system that the pressure of fluid delivered by the pump is at a minimum when the steering wheel is in neutral or straight-ahead position, increasing as the wheel is turned left or right, maximum fluid pressure being developed when the wheels of the vehicle are fully cramped to left or right under conditions of maximum resistance to turning of the wheels. Accordingly, the power required for operating the pump is at a minimum when the front wheels of the vehicle are in straight-ahead position, increasing when they are turned left or right, and at a maximum when they are fully cramped to left or right under conditions of maximum resistance to turning of the wheels. When the wheels are so cramped, and in the absence of an engine speed control such as provided by this invention, the increased load of the pump on the engine may cause the idle speed of the engine to decrease to the point where the engine stalls. The control of this invention functions to increase engine idle speed under such conditions to prevent stalling.

Referring now to FIG. 2, the carburetor 3 is shown to comprise a main body 23 formed to provide a vertical mixture conduit 25 and fuel bowl 27, a bowl cover 29 having an air horn 31 for mixture conduit 25, and a throttle body 33 having a throttle bore 35 coaxial with and in continuation of the mixture conduit. The throttle body is fixed to the inlet manifold M of engine 1. A float valve for controlling flow of fuel to the fuel bowl is indicated at 36. A throttle shaft 37 extends across the throttle bore and carries a throttle valve 39, which is constituted by a plate fitting in the bore 35. Extending across the air horn is a choke valve shaft 41 carrying a choke valve 43. A choke control is generally indicated at 45. A boost venturi 47 is provided in the mixture conduit. A so-called high speed fuel system for the carburetor comprises a metering jet 51 through which fuel may flow from the fuel bowl under control of a metering rod 53 to a passage 55 for delivery through a fuel nozzle 57 into the boost venturi.

An idle fuel and air system is provided in the carburetor to supply a fuel and air mixture to the engine for low speed or idle operation. The system comprises a fuel well 58 opening at its lower end into the main fuel passage 55. An idle fuel tube 59 having an open lower end extending below the normal fuel level in well 58 is connected at its upper end to a fuel passage 60 formed in the carburetor body. Passage 60 extends from the well 58 through the fuel bowl cover 29 downwardly to an idle fuel chamber 61 formed in the throttle body 33. An elongated idle port 62 opens chamber 61 into the throttle bore 35 adjacent to the edge of throttle valve 39 when in its closed position. Passage 60 extends through chamber 61 into a bore 64 connected by a second idle port 63 to the throttle bore 35 downstream of throttle valve 39. An idle adjustment screw 65 threaded into bore 64 has an inner pointed end to control flow through port 63.

The elongated idle port 62 is only partially closed by the edge of throttle valve 39, when it is in its closed position and part of port 62 extends upstream of throttle 39, as shown in FIGURE 2. This provides an air bleed into idle chamber 61 during closed throttle-idle operation, which air mixes with fuel from passage 60 to provide an air/fuel mixture. During engine idle or low speed, the negative vacuum pressure in manifold M is in the order of 18 inches mercury. This is effective to draw through port 63 sufficient fuel from passage 60 and air through port 62 to operate the engine at low speeds with no load.

In accordance with this invention, for increasing engine idle speed under the cramped-wheel conditions above mentioned, a supplementary throttle operating mechanism is provided. The throttle body 33 is provided with a fluid motor device 66 comprising an inclined boss 67 extending from the throttle body and having a cylindric recess 69 extending inwardly from its outer end. A passage 71 of smaller diameter than the recess 69 extends from the inner end of the recess to the throttle bore portion 35 of the mixture conduit. A throttle operating pin 73 has a sliding fit in passage 71 and has a head 75 on its outer end having a sliding fit in the recess 69. The pin extends through the passage 71 into the throttle bore portion 35 of the mixture conduit and its inner end is adapted to engage the throttle 39 adjacent the periphery of the latter as shown in FIG. 2. The arrangement is such that the pin is adapted, on inward movement thereof, to rotate the throttle 39 away from its idle position (in which it appears in FIG. 2). The pin is biased outward by a spring 77 toward engagement of its head 75 with a flexible diaphragm 79 having its margin clamped against the end of boss 67 on throttle body 33 by a ported cap 81 secured to the boss as by screws 83. The boss has a cavity at 85 to accommodate movement of the diaphragm. The pin in its retracted position may or may not touch the throttle plate in its closed position but it does not exert force on the throttle plate or interfere with normal throttle actuation.

Throttle operating pin 73 is controlled in response to pressure in the power steering system. For this purpose a fluid pressure line 87 is connected between the cap 81 of motor 66 and delivery line 19 between the outlet of the pump 13 and the power steering gear 11. Spring 77 is selected normally to restrain pin 73 from opening throttle 39 for pump delivery pressures below a predetermined value which is developed on cramping the front wheels of the vehicle as above described. At the predetermined pressure value the bias of spring 77 is overcome and pin 73 is driven inwardly to cause pivotal opening of throttle 39.

This predetermined value can be around 200 p.s.i. pressure or higher. But, obviously, this value varies with the system used as well as the type of installation where the manual throttle control is a factor.

Operation of the system is as follows:

With the engine 1 idling, the throttle 39 is closed as appears in FIG. 2. As long as the pressure of the hydraulic fluid in the line 89 does not exceed the predetermined value as above described, the throttle operating pin 73 remains in its retracted position, and the total air/fuel mixture requirement for engine idling is supplied by the idle system 59 of the carburetor in the same manner as heretofore. Whenever the front wheels of the vehicle are cramped to such an extent as to cause the pressure of hydraulic fluid in lines 19 and 89 to rise to the above-mentioned predetermined pin-operating value, the diaphragm 79 is flexed inwardly causing the operating pin 73 to crack open the throttle 39. Air now flows rapidly around the edge of the throttle value 39 and creates a low pressure or suction at port 62. Also, port 62 is now downstream of the throttle valve 39 and is exposed to the high manifold vacuum. This condition sucks fuel through port 62 which mixes with the additional air available by opening the throttle 39.

Addition of the air/fuel mixture through the throttle bore 35 to the fuel supplied to the engine by the idle system 59 of the carburetor increases the power of the engine. This prevents the engine from stalling under the increased engine load resulting from the increased demand on pump 13 due to cramping of the wheels. The spring 77 may be so selected as to provide for actuation of pin 73 to increase engine idle speed at any desired angle of the steering wheel of the vehicle either to left or right from the straight-ahead position. The depth of cavity 85 limits the distance of travel of pin 73 so that the throttle is only opened an amount sufficient to provide the desired amount of power to the engine.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In an automotive vehicle having an internal combustion engine, an accessory powered from the engine, mixture conduit means for supplying a mixture of fuel and air to the engine, a throttle shaft, a throttle on said shaft in said mixture conduit means, supplementary throttle operating means having a portion thereof positioned within said mixture conduit means and engaging said throttle to move the latter, and means responsive to operation of said accessory when said engine is idling for actuating said throttle operating means to move the throttle to increase the engine idle speed.

2. In an automotive vehicle having an internal combustion engine, an accessory powered from the engine, mixture conduit means for supplying a mixture of fuel and air to the engine, a throttle shaft, a throttle plate on said shaft in said mixture conduit means for controlling the passage of fuel and air therethrough, an operating pin having a portion thereof positioned within said mixture conduit means and engaging the throttle plate to move the latter, and means responsive to operation of said accessory when said engine is idling for actuating said pin to move said throttle plate to increase engine speed.

3. In an automotive vehicle having an internal combustion engine, an accessory powered from the engine, mixture conduit means for supplying a mixture of fuel and air to the engine, a throttle shaft, a throttle on said shaft in said mixture conduit means for controlling the passage of fuel and air therethrough, throttle operating means having a portion thereof positioned within said mixture conduit means and engaging and moving the throttle, said throttle operating means being spaced transversely from the throttle shaft and biased away from said throttle, and fluid operated means responsive to operation of said accessory when said engine is idling for actuating said throttle operating means to move the throttle to increase engine idle speed.

4. In an automotive vehicle having an internal combustion engine, an accessory powered from the engine, mixture conduit means for supplying a mixture of fuel and air to the engine, a throttle shaft, a throttle on said shaft in said mixture conduit means, a throttle operating pin extending into said mixture conduit means, the inner end of the pin engaging the throttle, a head on the outer end of said pin, a spring biasing said pin in the direction away from said throttle, a diaphragm having one side thereof engaging said head, and means responsive to operation of said accessory when said engine is idling for supplying fluid pressure on the other side of said diaphragm to drive the pin inwardly to open the throttle.

5. In an automotive vehicle having an internal combustion engine, a steering wheel, a power assist for said steering wheel operable by fluid under pressure, a pump powered by the engine for delivering fluid under pressure to said power assist, said pressure increasing and said pump imposing increasing load on the engine as the wheel is turned one way or the other, means including a mixture conduit for supplying a mixture of fuel and air to the engine, a throttle shaft in said mixture conduit, a throttle plate on said shaft for controlling the passage of fuel and air through said mixture conduit, and supplemental throttle operating means having a portion thereof positioned within said mixture conduit said portion engaging said throttle plate for opening the latter in response to increase of pump delivery pressure to a predetermined value.

6. In an automotive vehicle having an internal combustion engine, a steering wheel, a power assist for said steering wheel operative by fluid under pressure, a pump powered by the engine for delivering fluid under pressure to said power assist, said pressure increasing and said pump imposing increasing load on the engine as the wheel is turned one way or the other, mixture conduit means for supplying a mixture of fuel and air to the engine, said means including a throttle shaft and a throttle plate on said shaft in said mixture conduit means, an operating pin having a portion thereof positioned within said mixture conduit means, said portion engaging said throttle plate to move the latter from a closed to an open position, and fluid motor means directly actuating the operating pin to open the throttle plate for increasing the speed of the engine in response to increase of pump delivery pressure to a predetermined value.

7. In an automotive vehicle having an internal combustion engine, a steering wheel for turning the front wheels of the vehicle, means for assisting the turning of the front wheels, a pump powered by the engine for delivering fluid under pressure to said means, a carburetor for the engine, said carburetor having a throttle shaft and a throttle plate on said throttle shaft for controlling the passage of fuel and air through the carburetor, operating means extending into the carburetor engaging said throttle plate and adapted to move the latter, and means for actuating said operating means to move the throttle plate to increase engine idle speed in response to increase of pump delivery pressure on cramping the front wheels, said operating means comprising a pin, said means for actuating said operating means comprising a diaphragm one side of which engages the outer end of said pin, said diaphragm being adapted to drive said pin inwardly to move said throttle plate in response to increase of pump delivery pressure on the other side of said diaphragm.

8. In an automotive vehicle having an internal combustion engine, a steering wheel, a power assist for said steering wheel operative by fluid under pressure, a pump powered by the engine for delivering fluid under pressure to said power assist, said fluid pressure from said pump increasing and said pump imposing increasing load on the engine as the wheel is turned one way or the other, mixture conduit means for supplying a mixture of fuel and air to the engine, said means including a throttle shaft and a throttle plate on said shaft in said mixture conduit means, an operating pin having one end thereof positioned within said mixture conduit means, said one end of said operating pin engaging said throttle plate to move said throttle plate from a closed position toward an open position, a fluid actuated diaphragm engaging the other end of the operating pin and driving the pin toward the throttle plate to open the throttle plate for increasing the speed of the engine in response to increase of pump delivery pressure to a predetermined value.

References Cited in the file of this patent
UNITED STATES PATENTS

| | | |
|---|---|---|
| 2,913,921 | Gordon | Nov. 24, 1959 |
| 2,929,226 | Baker et al. | Mar. 22, 1960 |
| 3,022,849 | Braun | Feb. 27, 1962 |
| 3,042,134 | Majewski | July 3, 1962 |